April 22, 1952     G. G. GRIFFIN     2,594,012
METER BOX AND COVER THEREFOR
Filed March 13, 1950     2 SHEETS—SHEET 1
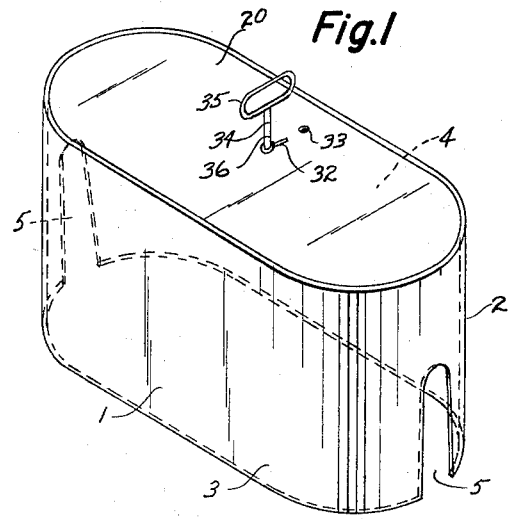
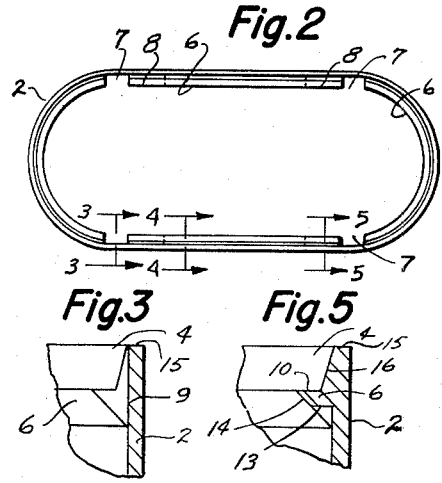
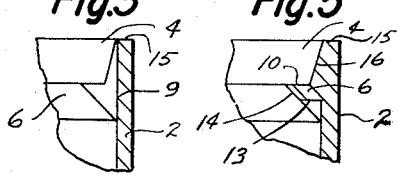
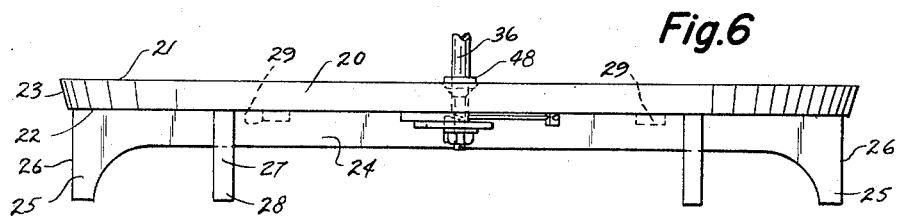
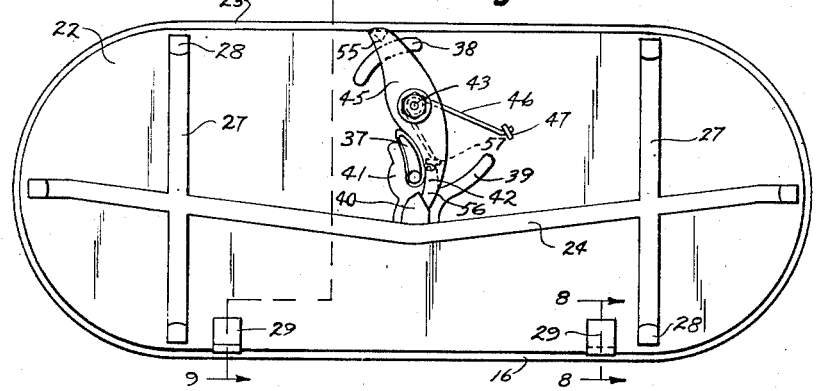
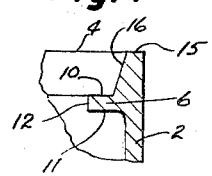
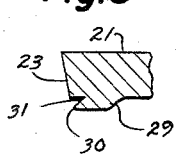
George G. Griffin
INVENTOR.
BY Beale and Jones
ATTORNEYS April 22, 1952          G. G. GRIFFIN          2,594,012
METER BOX AND COVER THEREFOR
Filed March 13, 1950          2 SHEETS—SHEET 2
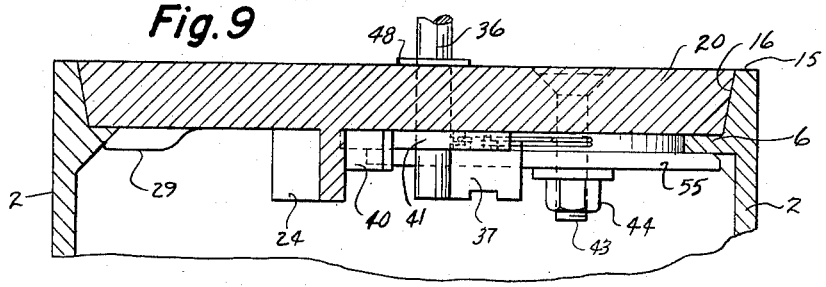
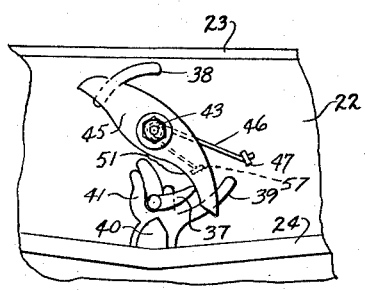
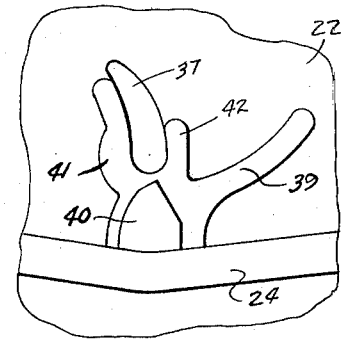
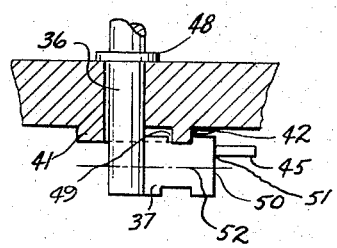
George G. Griffin
*INVENTOR.*
BY *Beale and Jones,*
ATTORNEYS Patented Apr. 22, 1952

2,594,012

UNITED STATES PATENT OFFICE 2,594,012

METER BOX AND COVER THEREFOR

George G. Griffin, Rome, Ga.

Application March 13, 1950, Serial No. 149,407

4 Claims. (Cl. 220—55)

This invention relates to a meter box and its improved cover and particularly relates to a construction which will permit the cover to be locked onto the meter box in a manner which will insure against unauthorized tampering with the protected meter.

As is well known in the art it has been customary for many communities to bury the water meters leading from the street water mains into individual dwellings or office buildings. There are a plurality of reasons for this practice. In the first place, it is convenient to have the meter located outside of the foundation walls of the building so that the meter reader may have access to the meter without entering the building. It is also desirable to have the meter and the connecting water lines located a sufficient distance below the surface of the soil to prevent freezing of the pipes in periods of extremely cold weather. It has therefore been customary to provide boxes, which may be either round or oval in horizontal cross section, and which are of sufficient depth to be inserted into the ground while leaving the lid or cover of the box at substantially ground level. It was found long ago that it was quite desirable to provide some means for locking the cover or lid onto the box structure to prevent unauthorized tampering with the meter. Attempts have been made in the past to construct covers which might be locked in such a manner as to prevent an unauthorized person from prying off the cover and to this end the art has seen examples of covers which are provided with a suitable keyhole permitting access to a lock which is in turn placed on the underside of the cover. Prior art structures of this type, however, suffer from either one of two distinct disadvantages. The locking mechanism necessary to make a securely locked cover is generally of a very complicated nature and invariably located almost directly beneath the keyhole. This permits water from rain or melting snow to seep into the interior of the covered meter box and rapidly corrode or rust the lock. Another disadvantage is that prior art covers are susceptible of being pried out of the meter box notwithstanding the security attempted by providing a lock.

The present invention is concerned with a cover which in turn is provided with a lid, the elements of which cooperate with the upper rim of the meter box in such a manner as to prevent the lid from being pried off of the box when locked. Moreover, the locking mechanism used in the present invention is disposed to one side of the keyhole and is disposed in such a manner as to be unaffected by any water which enters the interior of the meter box, as from rain or melting snow. Even more particularly the cover for this improved meter box is so constructed that if any effort is made to pry the cover from the meter box, the force utilized merely wedges the cover more firmly into position, that is, into locked position. Another feature of the improved cover is that it may be inserted in place from either side of the meter box and when so inserted may be locked with equal facility and security. A still different feature of the box is the provision of a key which may be used both to lock or unlock the lock which restrains the cover in position and which when turned into unlocking position may be used as a handle to lift the cover from the meter box. Other advantages and features of this invention will be apparent from the following description and from the accompanying drawings wherein like reference numerals represent like or similar elements.

In the drawings:

Figure 1 is a top view, partly in perspective, showing the meter box with cover in place and with the key in position.

Figure 2 is a top plan view of the meter box with the cover removed.

Figures 3, 4 and 5 are detail, cross sectional, views of portions of the top rim of the meter box as taken on the lines 3—3, 4—4 and 5—5, respectively, on Figure 2.

Figure 6 is a side elevation of the cover for the meter box.

Figure 7 is a bottom plan view of the cover with associated parts.

Figure 8 is a detail in cross section through one of the elements 29 showing the outer profile of each of such elements.

Figure 9 is an end elevation in cross section taken along the lines 9—9 of Figure 7.

Figure 10 is a detail, side elevation, partly in cross section, and partly broken away, showing the lower end of the key in unlocking or open position.

Figure 11 is a bottom plan view of a central fragment of the cover for the meter box shown in detail, without the key and attendant lock mechanism.

Figure 12 is a detail, showing a bottom plan view of the locking mechanism with the key in unlocking position by way of comparison with the same mechanism as shown on Figure 7 of the drawings.

Turning now to the drawings for a description of the individual elements as shown thereon and commencing with Figure 1, 1 represents generally the meter box which in this modification is shown as generally oval in shape. The meter box 1 has a continuous vertical sidewall 2, an open bottom 3, and an open top 4. Suitable notches 5 are provided in the vertical wall 2 of the meter box to accommodate a transverse line of pipe leading to and from the water meter and attendant valve. Within, and adjacent the top rim of the meter box, there is provided an inwardly extending annular lip or rim 6 which is broken at a plurality of symmetrically located points to provide gaps 7. At the points provided by gaps 7 the inner surface of the vertical wall 2 of the meter box will be a substantially vertical surface 9. It should be understood that preferably the meter box is formed of a single casting. Within the tolerance permitted by the casting operation, the inwardly extending rim 6 will, throughout a large portion of its perimeter have a substantially rectangular profile. Thus, it will have, as shown in Figure 4, a substantially flat horizontal top surface 10, a substantially flat horizontal bottom surface 11 and a substantially vertical inner edge 12. At symmetrically located positions, preferably adjacent the gaps 7, a plurality of tapered lugs 8 will be provided. These lugs 8, as shown in Figure 5 of the drawing, will have a substantially flat horizontal top surface 10 but the inner edge will be tapered downwardly and outwardly as shown at 14. Depending upon the tolerance of the casting operations, the bottom surface of the lug may be substantially horizontal as shown at 13 on Figure 5 or the inner edge may be tapered all the way to the inner wall of the box 12 as will be apparent from Figure 9 of the drawings. At all portions around the perimeter of the inwardly extending lip 6, including the tapered lugs 8, the top rim 15 of the meter box will be substantially uniform in width but the upper inner wall 16 of the meter box will be downwardly and inwardly tapered until it joins ledge 6 to provide a tapered seat for the meter cover.

The meter cover itself, designated 20, will be substantially the same in outline and dimensions as the tapered seat provided in the meter box. The cover will have a substantially flat horizontal top surface 21, it being understood of course that any type of design or tread may be cast on the top so as to permit the meter box and cover to be employed on sidewalks or street pavings where safety from slipping or skidding is a consideration. The bottom 22 of the lid per se will likewise be generally flat and of an outline conforming to the corresponding edge 16 of the meter box, it being understood that the peripheral edge 23 is downwardly and inwardly tapered so as to provide a snug seat on the tapered seat of the meter box lip. A stiffening rib or downwardly depending flange 24 will be disposed adjacent the major axis of the oval cover. Desirably, at each end of this member 24 the rib or flange will be extended downwardly to provide pedestal members 25. A pair of downwardly depending stiffening members or flanges 27, 27 may be disposed transverse to member 24 and will be located at positions which coincide with the gaps or slots 7 in the meter box. The outer ends of each of these transverse members 27 will likewise be extended downwardly to provide pedestals 28. The extreme outer edges 26 of members 24 and 27, 27 will be long enough and so disposed as to permit a relatively snug fit between the vertical surfaces thereof and the inner margin 10 of the supporting lip 6, or the inner wall 9 of the meter box 1 adjacent the gaps 7, respectively. Members 24, 27, 27 not only supply pedestals which permit the cover 20 to be placed on the ground or pavement without damage to the locking mechanism when lifted out of the meter box, thus protecting the locking mechanism attached to the underside of the cover, but have the additional function of stabilizing the cover within the confines of the meter box by assisting in preventing the tilting or prying up of the meter box by undesired tamperers. The leg members 25 of member 24 and the leg member 28 of members 27 should be long enough to insure this additional intended function of such members.

As has been explained above, the members 24, 27 and 27 are cast integrally with the top 20 of the cover. Also cast integrally adjacent one major side of the cover are a pair of lugs or bosses 29, 29. These bosses 29, 29 will be located at positions which permit coaction between them and the sections 8 of the ledge 6 which sections have beveled interior edges 14. These bosses 29 will be provided with inwardly and upwardly beveled faces 30 which provide a recessed notch 31 which will cooperate with surfaces 10 and 14 of elements 8 to provide a wedging fit. A keyhole 32 that portion of which is adapted to receive the stem of a suitable key being located substantially centrally of the cover 20, communicates between the top 21 and the bottom 22 of cover 20. A suitable bolt hole having a countersunk outer extremity is provided through the cover 20 at a point adjacent the keyhole 32.

As shown in Figure 1, a suitable key 34 having a bow or loop 35 and a suitable stem 36 is provided for the purpose of permitting the cover to be locked or unlocked as desired and when unlocked to be used as a lifting handle or bail for lifting the cover out of the meter box. The key will be provided with a suitable collar 48 of a size and shape adapted to prevent the insertion of the stem 36 of the key into keyhole 32 beyond a predetermined depth. The lower extremity of the key below the collar 48, i. e. the pin of the key, indicated as a prolongation of the stem 36 thereof, is provided with an outwardly extending bit or web 37. It is obvious that the dimensions and shape of keyhole 32 are such as to permit the insertion of the key 34 when web 37 thereof is placed in position within the tail of the keyhole.

Reverting now to the underside 22 of cover 20, it will be observed that a plurality of downwardly protruding bosses of particular configuration are provided. One of these bosses 38 is an arcuate member spaced from the adjacent outer edge of cover 20 and also spaced from the central axis of the aperture 33. Another boss is disposed adjacent the center of cover 20 and resembles, roughly, a linked double-U, the adjacent arms of which are superimposed. One outer leg 39 is somewhat arcuate in shape, the other outer arm 41 conforms to the shape of and contacts the adjacent edge of keyhole 32. The central leg 42 of the boss is spaced somewhat from, but extends along part of the opposite edge of, the keyhole 32. All three said legs terminate in a base from which protrudes a somewhat higher boss 40.

Turning now to the means for locking the cover, it will be noted that a suitable bolt 43 having a head adapted to fit snugly within the countersunk portion of aperture 33 and having a shank long enough to depend below the bottom of cover 20 serves to provide a pivot support for member 45 which may be termed the "bolt" of the lock. Desirably, the shank of the bolt 43 is threaded to accommodate a nut 44 and desirably after the nut 44 has been threaded into position the protruding threads of shank 43 are chamfered, to prevent rotation of nut 44 and its withdrawal from place. The shank of the nut will also be long enough to permit its encirclement with one or more coils of a suitable spring 46. Desirably spring 46 is of a type provided with a pair of outwardly diverging arms joined by one or more convolutes of the spring. The outer extremities of the spring arms may desirably be crimped or bent to permit their retention by a pair of ring members or bolts 47 and 57, it being understood that ring 47 may be set into the under face 22 of the cover 20 while ring 57 is set into or welded onto the top face of lock bolt 45.

The shape and size of the bolt member 45 requires explanation. The outer extremity 55 will extend, when in locking position, beyond the inner vertical edge 12 of rim 6 and for an appreciable distance beneath the bottom surface 11 thereof. Desirably, the upper extreme surface of end 55 of this bolt member will be somewhat tapered as will be indicated by Figure 9 of the drawings to facilitate locking engagement. Bolt member 45 will have an enlarged central portion and of course will be apertured to accommodate the shank of bolt 43 which pivotally supports it. The other end 56 extends beyond bolt 43 in an arc and terminates in a beveled face which cooperates with a correspondingly beveled face of boss 40. It will be obvious that boss 40 serves as a stop member for the cooperating end 56 of the locked bolt. The several elements making up the locking combination when in locked condition are shown as illustrated in Fig. 7 of the drawings.

It will be observed with reference to Figure 7 of the drawings that web or bit 37 of the key is arcuate in vertical outline. It preferably terminates in a vertical yet rounded end extremity 50 which is adapted to contact and move upon the arcuate surface 51 of lock bolt 45 much as does a cam follower move on a cam face. The top edge of the key web 37 is notched at 49, the notch being of a depth and width adapted to cooperate snugly with central arm 42 of the boss heretofore described. For the sake of illustration a horizontal center line 52 has been shown in dotted lines on Figure 10 of the drawings. It will be noted that cam surface 51 of the locked bolt 45 impinges against the bit or web 37 of the key and specifically against the outer edge 50 thereof above center line 52. It should be explained that the spring 46 is adjusted and tensioned so as to force lock bolt 45 normally into the locked position, i. e. the position illustrated in Figure 7 of the drawings. When the key 34 has been inserted in keyhole 32 and turned counterclockwise, a desired degree (preferably a quarter turn), until the key bit or web 37 assumes the position shown in Figure 12 of the drawings, the cam surface 51 bearing on edge 50 of the key bit or web bears above the center line 52 thereof. Unless counteracted the tension of the spring 46 operating on bolt 45 would tend to cause a tilting or vertical pivoting of key stem 36 within the keyhole. This tendency is stopped by the provision of arm 42 of the boss member. There is thus a pronounced and definite wedging of the bit or web 37 of the key between cam surface 51 and the boss 42. This wedging action tends to maintain the key in an unlocked, or open, position so as to permit the meter box cover to be lifted by means of the key loop or bail 35. This wedging may be augmented by providing a slight notch in the face of the cam surface 51 adjacent the fully opened or unlocked position of the key web 37.

In operation the cover is placed in position within the meter box top opening 4, with the key in the position shown in Figure 12 of the drawings. In making such placement, the loop or bail 35 of the key may be used as a lifting handle for the meter box cover. The cover may be placed in position from either side of the meter box and when so placed the edge of the cover opposite extremity 55 of the lock bolt 45 will be elevated slightly so as to insert the tappered extremity of wedge elements 8 within the wedge recesses 31 of the boss members 29. The elevated edge of cover 20 is then lowered so that it is substantially horizontal and firmly seated within the meter box and on top of the rim 6 thereof. The downwardly depending legs or pedestal members 25 and 28, of members 24 and 27 respectively, aid in centering the cover with respect to the meter box. When the meter box has been so covered the key is then rotated to the position shown in Figure 7 of the drawings and is withdrawn. The cover is then locked firmly into and upon the meter box. The wedging effect of boss members 29, cooperating with the beveled undersurfaces of cooperating members 8 on one side of the cover, balance the wedging and locking effect of extremity 55 of lock bolt 45 under the ledge 6 of the opposite side of the meter box. When the cover has been locked on the meter box the key may be withdrawn after which the cover may only be unlocked by the use of a key which satisfies the mechanical requirements of the herein described lock.

There are certain outstanding advantages out of the construction hereinbefore described. Once the cover has been locked in place it may only be unlocked by the use of a carefully designed key. Any effort to pry the cover free from the meter box is met with opposing wedging forces which resist such efforts. The two extremities 55 and 56 of lock bolt 45 are supported by the bosses 38 and 39 and 42, respectively, both of which tend to resist any elevation or lowering of lock bolt 45 about its pivot bolt 43. The end 56 of lock bolt 45 is positively stopped against boss 40. The locking and wedging action provided by lock bolt 45 and by bosses 29, 29 respectively is augmented by the downwardly depending legs or pedestals of elements 24, 27, 27. The beveled perimeter 23 of cover 20 also cooperates with the beveled inner face of the meter box rim above the supporting ledge 6. By the same token the beveled rim of the meter box 2 cooperates with the tapered lugs 29, 29 and lock bolt 45 so that the cover is held firmly in its seat on the meter box and its top 21 is held flush with the top of the meter box. Thus the cover cannot be rattled up and down or pried with a screw driver or similar instrument.

When the key has been removed the only part of the locking mechanism which is exposed on the top of the cover is the head of the countersunk bolt; desirably this head will be machined so that it fits snugly into the countersunk recess provided for it and will resist any efforts to turn or remove it. The removal of the bolt head will be resisted by the nut on the lower end of bolt 43 which as explained before is held in place by chamfering or abrading the lower end of the bolt stem or the nut.

In addition to the foregoing features there are some others which are of importance. Desirably the spring 44 will be made of a suitable brass alloy although other materials may be employed in the construction of the spring. The spring itself should be of a material which will resist corrosion and retain its "life" in the presence of the atmospheric dampness which will exist below the meter box cover and within the meter box itself. In addition to the material used in preparing the spring it should be observed that practically 90 per cent of the spring is sheltered between the under surface 22 of the cover and the upper surface of the lock bolt member 45. The spring is likewise disposed off to one side of the keyhole so that it is out of the path of any moisture which might seep into the meter box from melting snow, rain, or the like. The arms of the spring are appropriately anchored and the coils of the spring are likewise fixed in a position which is concentric with the vertical axis of bolt 43. Thus the spring cannot get out of its intended position. It will be understood, of course, that the spring is under compression when the lock member 45 is in the locking position illustrated in Figure 7 of the drawings; because of this circumstance the lower end 56 of lock bolt 45 is continuously urged against the stop provided by boss 40 and in turn the opposite end 55 of lock 45 is continuously urged into position under ledge 6. That part of the keyhole 32 which accommodates the stem of the key is centrally located with regard to the area defined by the outline of cover 20. Thus, when the key is used to unlock the locking mechanism, and is then used as the bail for lifting the cover out of position, the key is disposed at approximately the center of gravity of the cover. The cover thus may be easily handled when unlocking, lifting, removing, or carrying the cover, as well as when tilting the cover for reinsertion on top of the meter box. It should not be overlooked that the members 24, 27 and 27 not only serve the functions hereinabove described but additionally serve as strengthening members or reinforcing members which enable the cover to withstand street traffic when the meter box and cover is installed on highway surfaces.

I claim:

1. A meter box having an inwardly extending ledge providing a seat for a cover, a plurality of spaced, aligned gaps in said ledge and a plurality of spaced, aligned bosses disposed adjacent said gaps, said bosses each having a tapered inner edge, a cover for said meter box adapted to fit snugly within said meter box and on the ledge thereof, a plurality of stiffening members disposed on the under face of said cover, said stiffening members having downwardly depending pedestal members the outer faces of which are adapted to lie close to and parallel to the inner wall of said meter box for an appreciable distance, some, at least, of said pedestal members being disposed for insertion in the said spaced gaps in said ledge, a plurality of tapered lugs disposed on one side of said under face and adapted to engage said spaced bosses on said meter box, a keyhole in said cover adjacent the center thereof, a multi-armed boss on said under face of said cover, two of the arms of which are disposed on opposite sides of said keyhole, one of said two arms being spaced from the adjacent side of said keyhole, a lock for said cover comprising a pivotally supported lock bolt the outer end of which is adapted to engage the underside of the meter box ledge on the side thereof opposite the bosses thereof engaged by the said tapered lugs on said cover, the inner end of which is adapted to engage a stop boss on said cover, a spring mounted between the under face of said cover and the opposed face of said lock bolt for biasing said lock bolt in locking position, said lock bolt having a cam-faced edge adapted for engagement with the end of the web of a key, the said arm, of said multi-armed boss, being adapted to be accommodated in a transverse notch in the web of a key, whereby the said web of a key may be wedged between said arm of said boss and the cam-faced edge of said lock bolt to maintain said lock bolt in unlocked position when a key is inserted in said keyhole and turned to unlocking position.

2. The device defined in claim 1 wherein the lock-spring comprises a coil spring having arms at opposite ends thereof for attachment to the said cover and the said lock bolt respectively.

3. The device defined in claim 2 wherein the coils of said spring embrace the lock bolt support.

4. The device defined in claim 3 wherein the said coils of said spring surround and are mounted on a tapered boss which seats the pivot bolt for said lock bolt.

GEORGE G. GRIFFIN.

REFERENCES CITED

The following references are of record in the file of this patent:

UNITED STATES PATENTS

| Number | Name | Date |
| --- | --- | --- |
| 194,402 | Barns | Aug. 21, 1877 |
| 911,256 | McWane | Feb. 2, 1909 |
| 1,281,332 | Ford | Oct. 15, 1918 |
| 1,902,731 | Sherman | Mar. 21, 1933 |
| 2,007,509 | Thomas | July 9, 1935 |